March 25, 1969     A. H. MARK ET AL     3,434,437
PRECISION PLANTER WITH SEED ACCELERATOR
Original Filed June 25, 1964

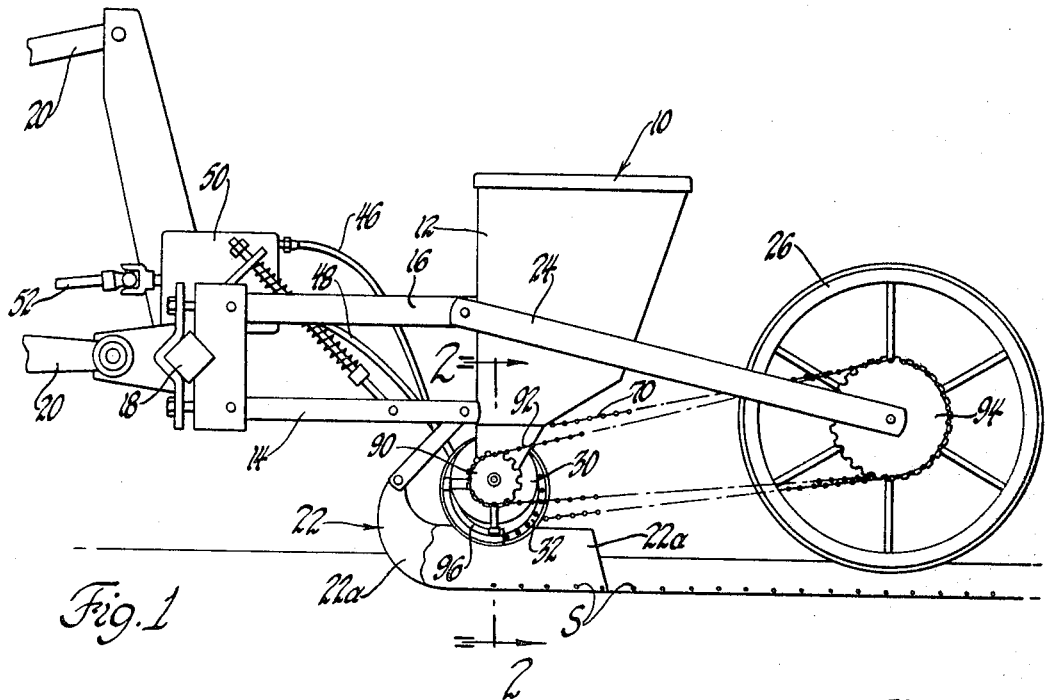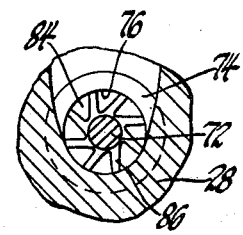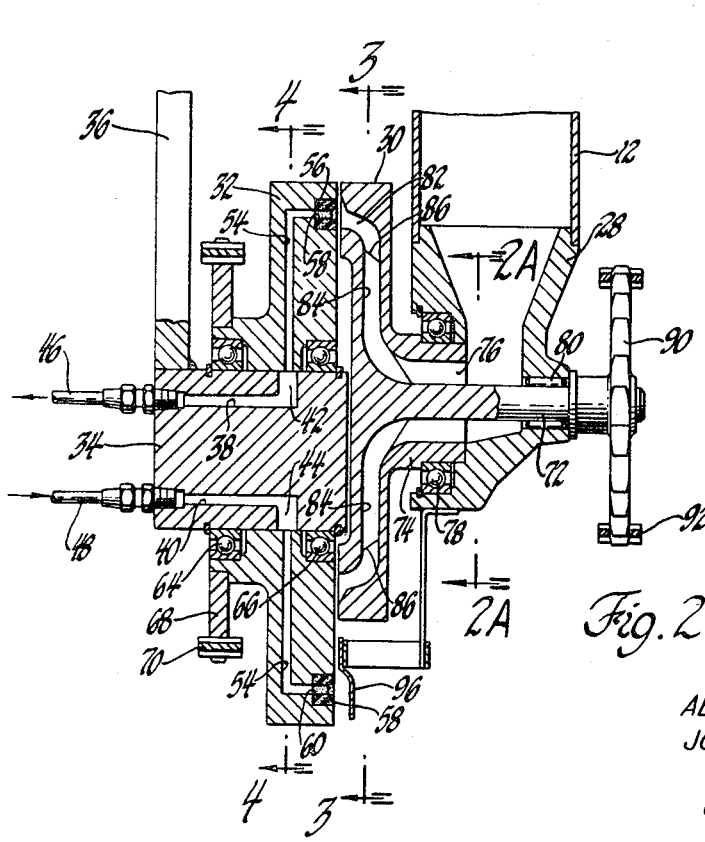

INVENTORS.
ALEXANDER H. MARK &
JOHN E. MORRISON, JR.

Tweedale & Gerhardt
ATTORNEYS.

United States Patent Office 3,434,437
Patented Mar. 25, 1969

3,434,437
PRECISION PLANTER WITH SEED ACCELERATOR
Alexander H. Mark, Livonia, and John E. Morrison, Jr., Royal Oak, Mich., assignors to Massey-Ferguson Inc., Detroit, Mich.
Continuation of application Ser. No. 378,002, June 25, 1964. This application Oct. 17, 1966, Ser. No. 587,350
Int. Cl. A01c 7/04, 5/06; B65h 3/08
U.S. Cl. 111—85                    22 Claims

ABSTRACT OF THE DISCLOSURE

A seed planter having a seed carrying element that moves one or more seeds from a collecting area to a release point. Seed acceleration means acts on seeds from a supply to impart a directional velocity to individual seeds such as the transfer of these individual seeds to the carrying element in the collecting area takes place with a minimum differential velocity between the seed and the seed carrying element.

This is a continuation of our application Ser. No. 378,002 filed June 25, 1964 and now abandoned.

This invention relates to planters and more particularly to precision planters of the type in which seeds are metered from a supply and deposited in a furrow at selected intervals.

In the development of precision planters for seeding row crops and the like, considerable difficulty has been encountered in metering the seeds from a supply hopper into a furrow at selected intervals. The metering member for carrying the seeds from the supply hopper to a seed drill or the like was expensive and mechanically complex, and was suitable generally for seeds of a particular size only.

In attempting to overcome the foregoing limitations, vacuum-type planters have recently been developed in which a rotating suction member having a plurality of vacuum ports is disposed adjacent the outlet of a seed hopper such that the vacuum ports pick up seeds from the outlet and deposit them at the seed drill when the vacuum is released. Frequently, the seeds become jammed in the hopper outlet and the vacuum ports move past the outlet without picking up a seed, and often more than one seed will be picked up by each port. Some attempts have been made to alleviate this problem by positioning stirrers or agitators in the hopper outlet to maintain the seeds in constant motion as the vacuum ports move past the hopper outlet. However, this has met with little, if any, success in reducing the number of misses by the vacuum ports. Primarily due to the high relative velocity of the vacuum ports with respect to the seeds in the hopper outlet.

An object of this invention is to provide a precision planter in which seeds from a supply hopper are accelerated into the path of a moving metering member to a velocity substantially equal to the velocity of the metering member such that at the point where individual seeds are to be picked up by the metering member, the differential velocity between the metering member and the seeds is approximately zero.

A further object is to substantially reduce the forces acting between the metering member of a precision planter and the seeds by accelerating the seeds to substantially the same velocity as the metering member at the point where they are picked up by the metering member.

Another object lies in the provision of a vacuum metering member for a precision planter in which the size of the vacuum ports can be selectively changed in accordance with the size of the seed to be planted.

A planter embodying the present invention includes a metering member which operates to successively pick up and transport seeds from a seed collection area to a deposit point at a seed drill. In order to reduce the forces acting on the seeds as they are picked up by the metering member, an accelerator member, mounted in the hopper, transfer the seeds from an at rest position within the hopper to the seed collection area and at the same time imparts a velocity to the seeds which is substantially equal to the velocity of the metering member.

Other objects and advantages of the invention will become apparent from the following description of a specific embodiment of the invention illustrated in the accompanying drawings in which:

FIG. 1 is a side elevation of a seed planter embodying the present invention;

FIG. 2 is a sectional view taken on line 2—2 of FIG. 1;

FIG. 2A is a sectional view taken on line 2A—2A of FIG. 2;

Figure 3:
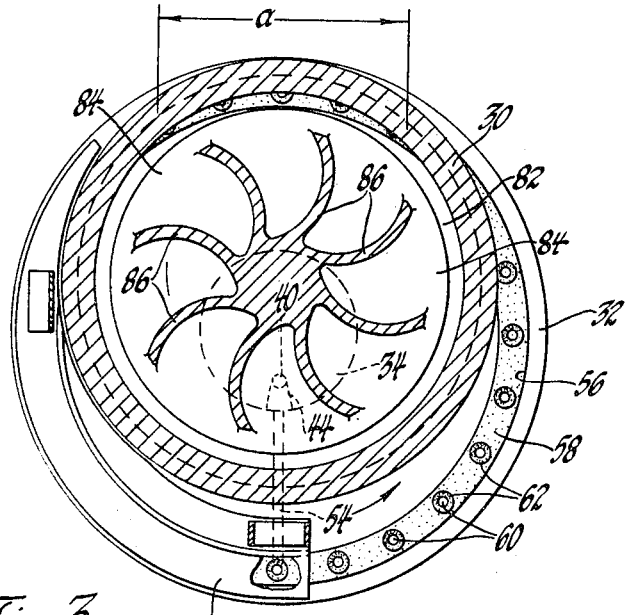
Figure 4:
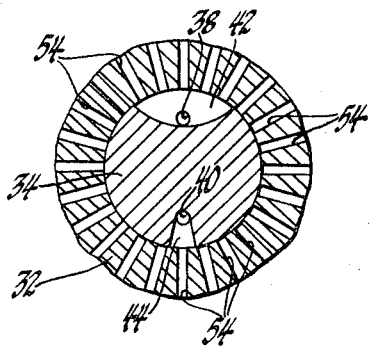
Figure 5:
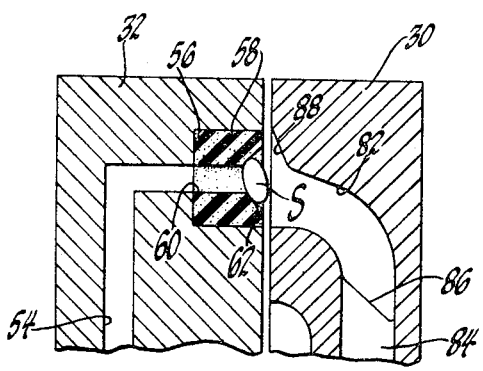

FIGS. 3 and 4 are sectional views taken on lines 3—3 and 4—4 respectively of FIG. 2; and FIG. 5 is an enlarged sectional detail view.

While the invention will be described in connection with a preferred embodiment, it will be understood that we do not intend to limit the invention to the specific embodiment illustrated. On the contrary, we intend to cover all alternatives, modifications and equivalents as may be included within the spirit and scope of the invention.

In FIGURE 1, a planter is designated generally by reference numeral 10 and includes a seed hopper 12 supported on link members 14 and 16 secured to a tool bar 18. Tool bar 18 in turn is connected with the rear draft links 20 of a tractor (not shown). Disposed beneath hopper 12 in engagement with the ground is a seed drill 22 of suitable construction having diverging blades 22a between which seeds S are deposited as the drill opens a furrow. Connected with link member 16 by a draw bar 24 is a press wheel 26 which closes the furrow over the seeds after they have been deposited in the furrow.

Hopper 12 has its outlet fitted onto a hollow casting 28 in which is mounted a seed accelerator member 30. Rotatably mounted on a fitting 34 carried by a support plate 36 secured to hopper 12 is a drum or metering member 32. Fitting 34 is formed with a vacuum port 38 and a pressure port 40 communicating respectively with a vacuum chamber 42 and a pressure chamber 44 (FIG. 4) formed in fitting 34. Vacuum port 38 is connected through a conduit 46 with the intake of a pump 50 (FIG. 1), and pressure port 40 is connected through a conduit 48 with the discharge side of the pump. Pump 50 is mounted on tool bar 18 and driven by the power take off shaft 52 of the tractor in any suitable manner.

As shown in FIGURE 4, metering member 32 is formed with a plurality of radial ports 54 communicating at their outer ends with an annular groove 56 formed on the end wall or face of metering member 32. Received in groove 56 is an annular ring 58 of resilient cellular material, such as foamed polyurethane, formed with a plurality of seed carrying elements in the form of apertures or ports 60 communicating respectively with each of the ports 54. Conical depressions 62 surround the outer ends of apertures 60 as shown in FIGURE 5 to provide a recess for the seeds.

Member 32 is rotatably supported on fitting 34 by means of bearings 64 and 66 (FIG. 2). Rotation of metering member 32 is obtained by means of a sprocket 68 connected through a chain 70 with a drive sprocket carried by press wheel 26 not visible in the drawings.

Accelerator member 30 is formed with a chamber 82 and an inlet opening 76 communicating with the hopper outlet through the hollow interior of casting 28. Projecting centrally through opening 76 is a shaft 72 integrally formed with member 30, and which, together with the outer hub portion 74 surrounding opening 76, rotatably supports accelerator member 30 in casting 28. Hub 74 and shaft 72 are journalled in casting 28 on bearings 78 and 80, respectively. Chamber 82 preferably communicates with opening 76 through a plurality of radial chambers or passages 84 (FIG. 3) formed by curved, radial vanes or side wall members 86. With accelerator 30 rotating in a counter-clockwise direction as viewed in FIG. 3, seeds from the hopper enter opening 76 and are hurled toward the outer periphery of chamber 82 by centrifugal force. Chamber 82 is formed with a circular, open end having an outwardly inclined peripheral edge portion 88 for guiding the seeds into the path of seed carrying elements 60.

As shown in FIGS. 2 and 3, the outer diameter of the open end of chamber 82 is less than the diameter of the annular ring 58 containing apertures 60. Thus, chamber 82 must be noncoaxially oriented with respect to the end wall of metering member 32 in which ring 58 is mounted in order to provide communication between apertures 60 and chamber 82. The axis of rotation of accelerator member 30 is spaced from the axis of rotation of metering member 32 with the members oriented with respect to each other such that chamber 82 registers with a segment or portion of the annular ring 58 in the collection area designated approximately at $a$ in FIG. 3. Thus, each seed carrying element 60 communicates with chamber 82 during a portion of its travel in a circular path about the axis of member 32.

With reference to FIGURES 2 and 4, as the suction drum or metering member 32 rotates about the axis of fitting 34, the upper ports 54 pass in communication with vacuum chamber 42 and the lower ports 54 pass in communication with pressure port 44. Consequently, as each aperture 60 comes into communication with chamber 82, it is connected with vacuum through chamber 42 and port 38. As the port continues to rotate in a counterclockwise direction as viewed in FIG. 3, it passes out of communication with chamber 82 due to the eccentric relationship between chamber 82 and member 58 until it reaches a position diametrically opposed to that shown in FIGURE 5, where it comes into communication with pressure port 44. The vacuum pressure is instantaneously released and the port is connected with positive pressure from chamber 44.

Accelerator 30 is driven by a sprocket 90 fixed to the end of shaft 72 and a chain 92 with a drive sprocket 94 mounted on the axle of press wheel 26. Metering member 32 and accelerator member 30 rotate in the same direction (counterclockwise as viewed in FIG. 3). Rotation of accelerator 30 causes the seeds to be hurled into chamber 82 by centrifugal force to impart to the seeds a tangential velocity in approximately the same direction as the tangential velocity in approximately the same direction as the tangential velocity of apertures 60 as apertures 60 pass through area $a$. By proper selection of the relative sizes of the various sprockets, the tangential velocity of the seeds in chamber 82 is made substantially equal to the tangential velocity of apertures 60 in collection area $a$. Thus, during the time that apertures 60 are in communication with chamber 82, the relative velocity between the seeds and seed carrying apertures 60 is substantially zero. Since the seeds are continuously fed into chamber 82 by rotation of accelerator 30, a constant supply of seeds is maintained for the seed apertures 60.

In operation, hopper 12 is filled with seeds and the planter is pulled toward the left by the tractor as viewed in FIG. 1. Chains 70 and 92 transmit counterclockwise rotation, respectively, to metering member 32 and accelerator member 30 as viewed in FIGS. 1 and 3. Seeds from the hopper pass from the hopper outlet through opening 76 into passages 84, and are guided by passages 84 into chamber 82 under the influence of centrifugal force. As the seeds move to the outer periphery of chamber 82, they are guided into the path of apertures 60 by the outwardly inclined peripheral edge portion 88 (FIG. 5).

A segment of annular ring 58 communicates with the open side of annular chamber 82 in collection area $a$. During the time that each seed carrying aperture 60 travels through collection area $a$, it is in communication with vacuum chamber 42 (FIG. 4). Morever, as pointed out previously, the ratios of the drive sprockets for members 30 and 32 carried by the axle of press wheel 26 with respect to sprockets 68 and 90 are such that the tangential velocity of the periphery of chamber 82 and annular ring 58 in area $a$ are substantially equal. Thus, a stream of seeds S travel through area $a$ at the outer periphery of chamber 82 at substantially the same velocity as those apertures 60 traveling through area $a$. Therefore, as each seed aperture 60 moves adjacent a seed S, the only significant differential force acting between the port and the seed is the suction force from vacuum chamber 42. Consequently, the seed, guided by inclined edge 88, is pulled into depression 62 and is held there by the vacuum force. As the seed carrying aperture 60 continues to move in a counterclockwise direction out of area $a$, it carries the seed with it due to the vacuum pressure trapped in ports 54 (FIG. 4) between chambers 42 and 44.

When the aperture carrying the seed comes into contact with pressure chamber 44, the seed is expelled from depression 62 by the positive pressure and falls onto the ground between the blades 22a of seed drill 22. Each seed carrying port 60 preferably comes into communication with pressure chamber 44 as it passes through the lowermost point of its path of rotation about the axis of fitting 34 so that the tangential velocity is in a horizontal direction opposite to the direction of movement of the planter. With proper choice of ratio between sprocket 68 and the sprocket through which it is driven by chain 70, the seed, at the moment it is released from its seed carrying aperture 60, will have a horizontal velocity toward the right as viewed in FIG. 1 which is equal in magnitude to the horizontal velocity of the tractor and planter, but in the opposite direction. As a result, the seed will have a horizontal velocity of zero with respect to the ground and will fall onto the ground at a point vertically beneath its point of release. An arcuate plate 96 carried by casting 28 (FIGS. 2 and 3) limits the lateral movement of the seed as it is expelled or released from port 60.

Since the only differential forces acting between the seeds and apertures 60 are those imposed by the inclined edge portion 88 and suction from vacuum chamber 42, both of which tend to move the seed into depression 62 surrounding each aperture, each aperture 60 will pick up a seed as it passes through chamber 82 so long as accelerator 30 maintains a continuous supply of seeds in chamber 82.

If the seed carrying apertures 60 were required to pick up the seeds from an at rest position, the inertia force differential would resist the vacuum force in ports 54 and in many cases would be sufficient to overcome the vacuum. Consequently, the apertures would frequently fail to pick up a seed. With accelerator 30, however, the seeds are transferred from their at rest position within the hopper to collection area $a$ and at the same time are accelerated to the velocity of the seed carrying elements 60. Thus, the forces tending to resist the vacuum pressure are substantially eliminated. This allows a much lower vacuum pressure to be used with a smaller vacuum pump. Also, a lower vacuum pressure reduces the likelihood of several seeds being attracted to the apertures 60 and held by a high pressure differential. By using different plastic inserts 58 having different size apertures 60, the planter can be adapted for different size seeds. If desired, the entire metering member 32 can be replaced with different size apertures.

We claim:
1. A seed planter including a metering member having at least one seed carrying element cyclically movable between a seed collection area and a seed release point for successively picking up and transporting seeds individually from the collection area to the release point characterized by having seed accelerator means for transferring the seeds from an at rest position within a seed supply into the path of said seed carrying element in the seed collecting area and imparting a velocity to the seeds in the collecting area substantially equal to the velocity of the seed carrying element during the time the seed carrying element is traveling through the seed collecting area.

2. A seed planter as defined in claim 1 in which the accelerator means comprises a rotating chamber communicating with the supply of seeds and having a portion at all times disposed within said seed collection area, said seeds being transferred from the supply to the seed collecting area by centrifugal force generated by rotation of said chamber.

3. A seed planter as defined in claim 2 further including an outwardly inclined peripheral wall for said chamber operable to deflect seeds in a direction parallel to the axis of rotation into the path of the seed carrying element.

4. A seed planter as defined in claim 2 in which the seed carrying element travels in a circular path between the seed collection area and release point and passes in communication with a portion of said rotating chamber at the seed collecting area.

5. A seed planter as defined in claim 4 in which said rotating chamber has a circular, open end of less diameter than the diameter of the circular path of the seed carrying element, said circular path lying in a plane parallel to the plane of the circular, open end of said rotating chamber and being eccentrically disposed with respect thereto such that a peripheral portion of said circular path communicates with a peripheral portion of said circular, open end to define the seed collecting area.

6. A seed planter as defined in claim 5 further including a press wheel for closing the furrow behind the seed drill as the planter moves horizontally along the ground, and drive means interconnecting the press wheel with the metering number and accelerator means in such a manner that the tangential velocities of the communicating peripheral portions of said circular path and circular open end are substantially equal and the horizontal speed of the seed carrying element at the release point is equal in magnitude but in the opposite direction to the horizontal speed of the planter such that each seed, when released, has a horizontal velocity of zero with respect to the ground.

7. A planter as defined in claim 5 in which the metering member comprises a rotatable drum and the seed carrying element comprises a port in the wall of said drum, and further including means for connecting said port with vacuum pressure from the time it first communicates with the collecting area until it reaches the release point, and means for connecting said port with a positive pressure at said release point.

8. A seed planter having a seed carrying hopper, a furrow opening drill and a rotatable suction drum with a plurality of apertures movable upon rotation of the drum in a path to successively pick up and carry seeds from a collection area to the drill characterized by having a rotatable accelerator member with a chamber therein for transferring seeds from the hopper to the collection area by centrifugal force, the relative speeds and sizes of the chamber and suction drum being such that the seeds pass through the collection area in a path substantially parallel to the path of the apertures and at a velocity substantially equal to the velocity of the apertures in said collection area.

9. A seed planter as defined in claim 8 in which said apertures are disposed in a circle on an end wall of the drum and said accelerator chamber has an open, annular end disposed in parallel opposed relationship with respect to said end wall with a peripheral portion only of said open annular end wall communicating with a peripheral portion of said circle to define the seed collection area.

10. A seed planter as defined in claim 8 further including an annular groove formed in an end wall of said suction drum, a ring of resilient material disposed in said annular groove, said apertures being formed in said ring of resilient material, and a port in said groove connected with each of said apertures for alternately connecting and disconnecting the apertures with vaccum pressure.

11. A planter as defined in claim 10 further including a conical depression formed in the outer face of said resilient ring surrounding each of said apertures.

12. A planter as defined in claim 11 in which said accelerator chamber has an open end with an outer periphery of less diameter than the diameter of said resilient ring and disposed in opposed, eccentric relationship with respect to said end wall such that a peripheral portion only of said open end communicates with a portion of said annular ring, and said open end having an outwardly inclined peripheral edge disposed to deflect seeds from said chamber toward said resilient ring.

13. A seed planter as defined in claim 12 in which said accelerator member has an inlet opening at its axis of rotation communicating with the hopper outlet and a plurality of radial passages connecting the inlet opening with said chamber.

14. A seed metering and dispensing assembly comprising, a rotatable metering member having at least one seed carrying element radially spaced from the axis of rotation of said metering member, a rotatable accelerator member having a chamber formed therein with an inlet connected with a seed supply, said metering member and said accelerator member being non-coaxially oriented with respect to each other, and said members being disposed with respect to each other such that the path of said seed carrying element communicates with said chamber during a portion of its travel about the axis of said metering member permitting the seed carrying element to remove seeds from said chamber, and drive means for rotating the members about their respective axes at speeds such that the velocity of that portion of the chamber with which the seed pick up means communicates is substantially equal to the velocity of the seed pick up means during said communication.

15. A seed metering assembly comprising a rotatable metering member, an annular groove formed in said metering member, a plurality of ports in said metering member communicating with said groove, an annular ring of resilient material removably seated in said groove, and a plurality of apertures in said annular ring of resilient material, each of said apertures being in communication with one of said ports.

16. The construction as defined in claim 15 further including a seed receiving depression formed in said annular ring surrounding each of said apertures.

17. A planter comprising a supporting frame; a seed container mounted on the frame; a metering member mounted on the frame and having at least one seed carrying element cyclically movable along a first fixed path past a seed release point for successively picking up seeds along said fixed path and transporting the seeds individually to the release point; an accelerator member mounted on the frame operable to carry seeds from an at-rest position within the container to a second fixed path at least a portion of which is contiguous with the first fixed path and thereafter carry the seeds cyclically around said second fixed path; said seed carrying element and said seeds moving along their respective paths in the same direction with respect to the seed release point with the relative velocities of the seeds and seed carrying element being such that the seed carrying element comes into communication with the seeds at selected intervals at the contiguous portions of said first and second fixed paths to receive a seed from the accelerator and transport it to the seed release point.

18. A planter as defined in claim 17 wherein said accelerator member is mounted for rotation on said frame and includes: an inlet opening communicating with the seed container near the axis of rotation of the accelerator member; an open-sided chamber spaced radially from said inlet opening and at least one radial passage connecting said inlet opening with said open-sided chamber for conducting the seeds centrifugally from the inlet opening to said chamber upon rotation of the accelerator member with the chamber rotating about the axis of the accelerator to define said second fixed path, said open-sided chamber being closed by said metering member except during said selected intervals when the seed carrying element is contiguous with said second fixed path.

19. A planter comprising a supporting frame, an accelerator member, a metering member having at least one seed carrying element, means defining a seed release point, means for supplying seeds to the accelerator member, means for driving the accelerator member to cause the accelerator member to move seeds centrifugally to a seed path and thereafter move the seeds along the seed path, means for driving the metering member to move the seed carrying element cyclically past the seed release point along a path at least a portion which is contiguous with the seed path in a direction such that the seed carrying element moves through said contiguous path of said seed carrying element and carrying the seeds along said seed path with the seeds moving in the same direction as the seed carrying element through said contiguous portion and the relative speed of the seed carrying element with respect to the seeds being such that the seed carrying element periodically communicates with the seeds at the contiguous portions of the respective paths of the seeds and seed carrying element and picks up seeds from the path for transport to the release point.

20. A planter comprising at least one seed carrying element, means defining a seed release point, means for driving the seed carrying element cyclically past the seed release point, seed supply means, means comprising a rotatable member operable to centrifugally move seeds from the supply to a seed path at least a portion of which is contiguous with the portion in the same direction as the seeds such that the seed carrying element periodically communicates with the seeds at the contiguous portion of the respective paths for picking up seeds from the seed path for transport to the seed release point.

21. A planter as defined in claim 20 wherein said rotatable member urges the seeds in the seed path toward the path of the seed carrying element.

22. A planter as defined in claim 21 further including means for applying suction to the seed carrying element during its travel through the contiguous portions of the respective paths of the seeds and seed carrying elements and to the seed release point from the contiguous portions, and means for releasing the suction when the seed carrying element reaches the seed release point.

References Cited

UNITED STATES PATENTS

| | | | |
|---|---|---|---|
| 3,100,462 | 8/1963 | Steele et al. | 111—77 |
| 3,133,676 | 5/1964 | Haun | 222—177 |
| 3,142,274 | 7/1964 | Winter | 111—34 |
| 3,156,201 | 11/1964 | Tweedale | 111—77 |

FOREIGN PATENTS 20,244    9/1904    Great Britain.

ABRAHAM G. STONE, *Primary Examiner.*

RONALD C. HARRINGTON, *Assistant Examiner.*

U.S. Cl. X.R.

111—78; 221—211

PO-1050
(5/69)

UNITED STATES PATENT OFFICE
CERTIFICATE OF CORRECTION

Patent No. 3,434,437          Dated March 25, 1969

Inventor(s) Alexander H. Mark, and John E. Morrison, Jr.

It is certified that error appears in the above-identified patent and that said Letters Patent are hereby corrected as shown below:

Column 7, line 31, cancel beginning with "path of" to and including "to the release point." in column 7, line 40 and insert the following: --portion in the same direction as the seeds such that the seed carrying element periodically communicates with the seeds at the contiguous portion of the respective paths for picking up seeds from the seed path for transport to the seed release point.--.

Column 8, line 7, cancel beginning with "portion in the" to and including "seed release point." in column 8, line 11 and insert the following: --path of said seed carrying element and carrying the seeds along said seed path with the seeds moving in the same direction as the seeds moving in the same direction as the seed carrying element through said contiguous portion and the relative speed of the seed carrying element with respect to the seeds being such that the seed carrying element periodically communicates with the seeds at the contiguous portions of the respective paths of the seeds and seed carrying element and picks up seeds from the path for transport to the release point.--.

SIGNED AND
SEALED
APR 7 1970

(SEAL)
Attest:

Edward M. Fletcher, Jr.
Attesting Officer

WILLIAM E. SCHUYLER, JR.
Commissioner of Patents